Patented June 2, 1953

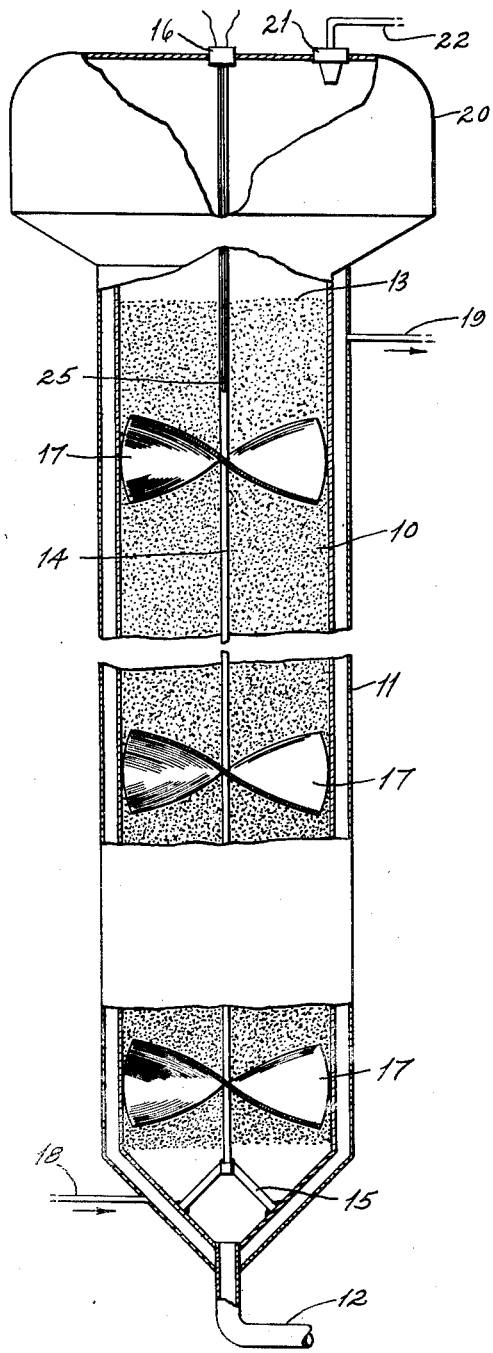

2,640,845

UNITED STATES PATENT OFFICE 2,640,845

HYDROCARBON SYNTHESIS

Roland A. Beck, Fishkill, and Eugene E. Sensel, Beacon, N. Y., assignors to The Texas Company, New York, N. Y., a corporation of Delaware Application May 1, 1947, Serial No. 745,358

6 Claims. (Cl. 260—449.6)

The present invention relates to the catalytic conversion of fluid reactants in the presence of powdered solid catalyst wherein the particles of catalyst are fluidized in an up-flow of reactant gases.

In accordance with the present invention a reaction zone is provided to which the fluid reactant or reactants are introduced at a relatively low inlet point and pass upwardly, aerating or suspending powdered catalyst in a condition of fluidization. At vertically spaced points throughout the reaction zone the upflowing reactants together with the fluidized phase of particles are subjected to a substantial swirling motion by means of helically or spirally disposed baffles. Intermediate of these spaced vertical points are regions of substantial vertical extent wherein the reactants are free to move upwardly in the fluid phase of particles without constraint.

This vertically discontinuous whirling action with intermediate dissipation in zones free of laterally directing influences, results in a distribution of the fluid phase which places the contact mass in a more uniform condition throughout the reaction zone; that is to say, with a substantially uniform distribution of solid particles in the reactor so that the up-flowing gases continuously make contact under predetermined conditions of time and temperature. Accordingly, therefore, the present invention has the advantage of overcoming the previous defects in operation referred to generically as "slugging" wherein the gasiform reactant tends to pass through the fluid phase in relatively large bubbles, in which the gas makes relatively poor contact with the catalyst surfaces. An undesirable form of slugging may be particularly objectionable in tubular reaction zones or in zones of limited sectional area with the bubbles of reactant gas carrying upwardly, slugs or masses of catalyst in a condition of relatively high apparent density. In short, the invention has the advantage of enabling the operation of a fluidized catalytic system under the condition of uniform contact which is required for proper operation. It has the further advantage of causing the substantial disruption or disintegration of conglomerate particles which may, and frequently do, occur as the result of accretion particularly where waxy or other adherent deposits are formed on the catalyst in the course of the reaction.

These advantages are obtained solely by changing the direction of movement of the reactant stream by means of stationary baffles configurated to induce a rotational or whirling motion, thus without requirement for mechanical actuation. In short, the present invention contemplates the periodic swirling or turbination of the fluid phase by means of fixed baffles of suitable configuration.

It is to be noted that vertical discontinuity of the baffle is essential in that a continuous helix or spiral would embody all of the disadvantages which it is the purpose of the present invention to overcome. Moreover, movement of the gases in a continual rotational or whirling path may tend to effect an undesirable segregation or classification of catalyst particles. In accordance with the present invention, however, the flow of gases containing the fluid phase is repeatedly subjected to a whirling type of distribution in predetermined zones intermediate of which the mixed phase tends to readjust itself more or less to the general up-flow of reactant gas.

In order to more clearly define the invention, reference may be had to the attached drawing which discloses one preferred embodiment of the present invention. Therein a reaction vessel 10 of more or less cylindrical form is jacketed about its outer surface as at 11 and provided with a lower frusto-conical extremity terminating in inlet conduit 12 for the introduction of reactant fluid from any suitable source, not shown.

Since the present invention is particularly applicable to the synthesis of hydrocarbons by the catalytic reduction of carbon monoxide with hydrogen, description will be hereinafter applied to a reactor for this purpose.

Accordingly, the reactor supplied through pipe 12 may be a typical gas comprising essentially hydrogen and carbon monoxide usually in the molar ratio of 2:1. This passes vertically upwardly within the cylindrical zone 10 suspending a contained mass of catalyst powder preferably in a dense "fluid" phase rising preferably to the pseudo-liquid level 13. The reaction zone contains a central shaft 14 supported by a spider 15 connected to the lower conical wall of the reactor as shown, and fixed at its upper extremity to the top wall of the reactor, as at 16. This central shaft or support 14 mounts a plurality of fixed, vertically spaced, radially extending, helical, or spiral screw-like baffles 17 which function to give the gases passing upwardly therethru, a whirling or rotational motion. The baffles shown have obviously, the general form of fixed propellers or turbine blades.

As will be apparent, from the foregoing, the baffles may be mounted otherwise than as disclosed. For example, the supporting shaft 14 may be completely omitted where peripheral portions of the baffles are attached to the walls of the reaction zone. Moreover, in such case the baffles may take the form of spiral or helical projections.

Moreover they need not progress helically in the same rotational direction but may alternately extend upwardly in relatively reverse rotational directions to give alternately opposite rotational impetus to the flow of fluid.

It is to be particularly understood that the terms helical and spiral, as used herein, are not limited to surfaces which bear a constant angular relationship to a plane which passes through the central axis thereof, but rather, are broadly intended to cover arrangements wherein such angular relationship may vary as in typical propeller-like surfaces, all of which are effective, as above indicated, to effect desirable uniformity of fluidization.

The catalyst may comprise any conventional particulate or powdered solid contact material capable of being aerated or suspended, as a "fluid" phase, in the particular flow of reactant gas provided. In connection with the hydrocarbon synthesis process referred to, the catalyst is advantageously one of the typical contact materials such as the iron group metals, or ruthenium. Suitably activated, promoted and conditioned metallic iron of appropriate particle size, for example size 100 mesh or finer, may be employed. Typical activators and promoters such as oxides of the alkali, or alkaline earth metals, thoria, zirconia, alumina, and the like may be incorporated in the catalyst. If desired, the catalytic ingredients may be deposited upon a support, e. g., diatomaceous earth. The linear rate of gas flow is that appropriate to maintain the desired condition of fluidization. Usually for powdered iron catalysts, this involves a vertical upward linear gas velocity, in the reaction zone, of 0.5 to about 3 feet per second.

Referring again to the reactor, the inlet pipe 18 at the lower portion of the jacket 11 permits an introduction of coolant from any suitable source. Coolant or vapors thereof as desired are withdrawn by means of outlet pipe 19 at any suitable rate and pressure whereby abstraction of the exothermic heat of reaction at a controlled rate enables maintenance of the fixed internal temperature in the reaction zone in the usual manner.

It will be apparent that any alternative means may be employed to accomplish this cooling function. For example, nests of cooling tubes may be disposed within the reactor vertically intermediate between the baffles 17 with suitable headers for control of the coolant flow. Likewise, the baffles 17 may be provided with internal passageways for the circulation of coolant liquid and thus provide heat transfer surfaces, per se. Alternatively in reactions requiring supplementary heat energy to supply endothermic requirements, the heat transfer liquid may be supplied to the heat exchange surfaces at a high temperature at which heat flows, at the desired rate, into the reaction zone. Likewise, evaporative coolants may be injected into the reaction zone to abstract heat herefrom in known ways.

The system is preferably operated to raise the fluidized phase to an upper pseudo liquid level 13 from which the reactant gases emerge into an upper or separating section 20 of the reactor. From there, they are withdrawn by way of filter 21 and outlet conduit 22. The withdrawn product may be treated by condensation and separation or in any other desired manner to separate liquid reaction products, and normally gaseous products can be recycled to the inlet pipe 12 if desired.

As intimated above, the present invention is of particular advantage in connection with reactors wherein the fluid phase contact mass resides within tubular zones of relatively small diameter. It is within relatively elongated tubular contacting chambers of less than about two inches in internal diameter, that the excessive slugging or discontinuity of the fluid phase tends particularly to occur, whereas in larger reaction zones it may not constitute a material problem. The invention therefore has particular application to upstanding reaction zones having an internal width or diameter less than about two inches.

It is particularly advantageous to provide propeller-like or helical surfaces which are formed to avoid the accumulation of catalyst particles on the upper portions thereof. Thus, while as broadly shown above, the angle of the helical surfaces may vary widely, it is advisable to provide a substantial helical angle at which solid particles are incapable of settling and resting upon such surfaces. This can be accomplished at angles greater than that corresponding to the angle of repose of the particular solid particles forming the fluid phase, under the conditions of operation. For example, the propeller-like or helical surfaces may be designed so that helical angle is at all points at least 45° or greater with respect to a plane normal to the axis of the helix. Where desirable, it is contemplated that the upper surface of the helix may be disposed at an angle appropriate to avoid residence of settled catalyst, while the downwardly facing surfaces thereof take any other angular form suitable to effect the desired whirling movement.

From the foregoing, it is apparent that the present invention not only assures uniformity of fluidization in reaction zones of restricted section, but, in addition, enhances heat transfer by virtue of the fact that the swirling gases with contained fluid phase catalyst tend to move at relatively high velocity across the cooling surfaces. Obviously this effect finds particular application in connection with tubular type reactors using preferably cylindrical reaction tubes of small internal diameter, less than about two inches, the external surfaces of which are contacted by the heat transfer fluid.

Such class of reactors includes the type employing a nest of upstanding, parallel reaction tubes supported at upper and lower extremities by headers or tube sheets with laterally intervening spaces in which is circulated a suitable heat transfer fluid such as the coolant above referred to. Thus, while the invention has been specifically described above in connection with an embodiment employing a single, jacketed tubular reaction zone it is equally suitable where a multiplicity of such tubes are arranged for parallel operation, with temperature control effected by indirect contact with a heat transfer fluid circulating about the outer surfaces of all the tubes. It will be appreciated, of course, from the foregoing, that each of the tubes of such a reactor will be individually provided with axially spaced helical baffles capable of imparting the necessary whirling motion as described above.

The axial spacing of the propeller like baffles may vary widely but is usually most effective in smaller diameter reactors with a spacing of from 1 to 6 times the internal diameter of the reaction zone. Ordinarily, for large diameter reactors, as for example, those of 5 feet and greater diameter, the baffles are desirably spaced not more than 5 feet apart. So also, where the embodiment shown in the figure of the drawing is employed, the central structure or supporting column 14 may be centrally bored as shown at 25 to receive a thermocouple or any other temperature responsive device to reflect internal reaction temperatures.

While the invention has been more specifically described in connection with synthesis of hydrocarbons, it is equally adaptable to endothermic processes such as fluid catalytic cracking or dehydrogenation operations and any others wherein heat transfer fluid, at a relatively high temperature, may supply the heat of reaction at a desired rate to the fluid phase. The invention, however, while particularly advantageous in connection with operations wherein heat is transferred to or abstracted from the reaction by associated heat transfer surfaces, is, in its broadest sense, not so limited since the advantages of fluid phase uniformity are in any event available. Accordingly, the invention is broadly adaptable to processes wherein reaction heat is handled in various ways, as where sensible heat is introduced or withdrawn with the incoming or outgoing reactants or catalyst as the case may be, or by means of a thermofor.

Obviously many modifications and variations of the invention as hereinbefore set forth, may be made without departing from the spirit and scope thereof, and therefore only such limitations should be imposed as are indicated in the appended claims.

We claim:

1. In the process of effecting the catalytic conversion of gaseous reactants into desired products of reaction by the upward passage of said gaseous reactants through an upstanding reaction zone containing a solid particle mass of powdered catalyst, at a linear rate effective to support the solid particle catalyst as a dense fluid phase of substantial vertical height within the reaction zone such that the contact between the reactants and the fluidized catalyst is sufficient to effect substantial conversion into desired products of reaction, the improvement which comprises maintaining substantially uniform distribution of the solid catalyst particles throughout the reaction zone by causing the upflowing stream of reactant gas, at at least one point intermediate of the vertical section of the dense fluid phase of catalyst to contact fixed, stationary helical surfaces developed about an upstanding axis and effective to impart substantial rotational movement to the reactant gas stream about said axis, without imparting upward velocity to the gas flow, thereafter conducting the reactant gas stream upwardly for a substantial distance through the fluid phase mass of catalyst under conditions permitting substantially free vertical flow, and withdrawing products of reaction from contact with the fluid phase of catalyst from the upper portion thereof.

2. The process according to claim 1 wherein the gaseous reactants comprise essentially a mixture of H₂ and CO, the catalyst comprises a hydrocarbon synthesis catalyst and the products of reaction thereby produced are hydrocarbons and the like.

3. The method according to claim 1, wherein contact with the fixed, stationary helical surfaces in accordance with claim 1 is effected at a plurality of vertically spaced points within the dense fluid phase of catalyst, separated by intermediate zones of substantial vertical extent maintained under conditions permitting substantially free vertical flow.

4. In the catalytic hydrogenation of carbon monoxide into desired products comprising hydrocarbons and the like by the upward passage of the gaseous reactants comprising essentially H₂ and CO through an upstanding reaction zone containing a solid particle mass of powdered hydrocarbon synthesis catalyst maintained at reaction temperature, at a linear rate effective to support the solid particles of catalyst as a dense fluid phase of substantial vertical height within the reaction zone such that contact between the reactants and the fluidized catalyst is sufficient to effect substantial conversion into said desired products of reaction, the improvement which comprises maintaining substantially uniform distribution of the solid catalyst particles throughout the reaction zone by causing the upflowing stream of reactant gas, at a plurality of vertically spaced points within the dense fluid phase of catalyst, to contact fixed, stationary helical surfaces developed about an upstanding axis and positively mounted against rotation to impart substantial rotational movement to the stream of reactant gas about said axis without imparting upward velocity to the gas flow, conducting the reactant gas stream emerging from contact with each of said helical surfaces upwardly through a substantial vertical column of fluidized catalyst in the space between said vertically spaced helical surfaces under conditions permitting substantially free vertical flow and withdrawing the products of reaction from the upper surface of the fluid phase.

5. The process according to claim 4 wherein reaction temperature is maintained at a substantially uniform value by indirectly transferring reaction heat to a heat transfer fluid through cooling surfaces in direct contact with said dense fluid phase of catalyst.

6. The method according to claim 4 wherein the spaced helical surfaces are separated a distance equal to about 1 to 6 times the diameter of the reaction zone.

ROLAND N. BECK.
EUGENE E. SENSEL.

References Cited in the file of this patent

UNITED STATES PATENTS

| Number | Name | Date |
|---|---|---|
| 1,973,270 | Schulwitz | Sept. 11, 1934 |
| 2,337,684 | Scheineman | Dec. 28, 1943 |
| 2,357,894 | Hemminger | Sept. 12, 1944 |
| 2,363,692 | Reed | Nov. 28, 1944 |
| 2,370,816 | Schonberg | Mar. 6, 1945 |
| 2,394,651 | Alther | Feb. 12, 1946 |
| 2,418,857 | Stratford et al. | Apr. 15, 1947 |
| 2,419,088 | Putney | Apr. 15, 1947 |
| 2,419,097 | Stratford et al. | Apr. 15, 1947 |
| 2,419,098 | Stratford et al. | Apr. 15, 1947 |
| 2,433,798 | Voorhees | Dec. 30, 1947 |
| 2,513,370 | Shaw | July 4, 1950 |

FOREIGN PATENTS

| Number | Country | Date |
|---|---|---|
| 46,340 | France | Apr. 30, 1936 |
| | (1st addition to 771,258) | |
| 574,892 | Great Britain | Jan. 24, 1946 |
| 584,252 | Great Britain | Jan. 10, 1947 |